UNITED STATES PATENT OFFICE.

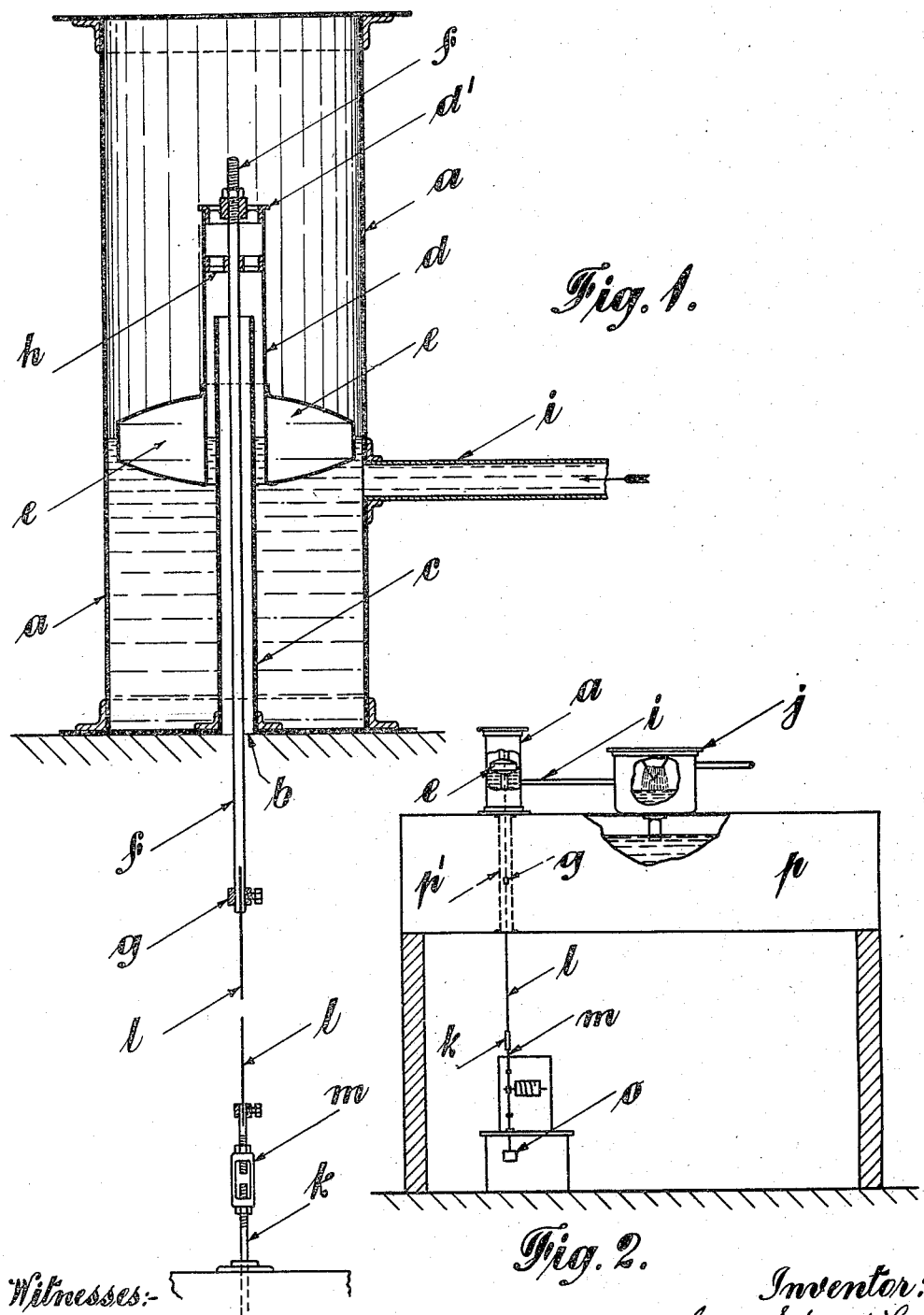

JAMES EDWARD LEA, OF MANCHESTER, ENGLAND.

LIQUID-MEASURING APPARATUS.

1,145,376.

Specification of Letters Patent. Patented July 6, 1915.

Application filed February 15, 1915. Serial No. 8,432.

*To all whom it may concern:*

Be it known that I, JAMES EDWARD LEA, a subject of the King of Great Britain and Ireland, and resident of Manchester, England, have invented certain new and useful Improvements in or Relating to Liquid-Measuring Apparatus, of which the following is a specification.

This invention refers to apparatus for measuring a liquid flowing over a V notch or weir, or through an orifice, and it relates, in particular, to apparatus of the kind known as the "Lea V notch recorder" and forming the subject of Letters Patent No. 815102. With such type of apparatus the measuring instrument is operated by a float situated within a float chamber, this latter communicating with a tank through which flows the liquid to be measured. The tank and float chamber are usually arranged at a point below the measuring instrument, the float being directly connected to the usual operating member of the instrument through the floor of the instrument casing. In some cases, however, the tank and float chamber require to be placed at a higher level than the instrument, and in such circumstances it is customary to use a cord or chain, one end of which is secured to the instrument, while its other end passes upward and outside the float chamber and over guide pulleys, to the float. With such an arrangement there is a considerable amount of friction, which interferes with the sensitive or correct working of the instrument.

This invention has for its object to provide a form of float chamber and float, which when used at a higher level than the instrument, allows of a direct, straight-line, frictionless connection between the float and the instrument.

In the accompanying drawing, Figure 1 illustrates a vertical section of the improved float chamber and float, while Fig. 2 illustrates the manner in which the invention is applied.

According to the invention and referring to Fig. 1, $a$ is the float chamber, usually in the form of a sheet-metal cylinder, closed top and bottom. In the bottom plate and central thereto is an orifice $b$, while secured to the bottom plate, and fixed vertically over the orifice, is an open-ended tube $c$. This tube rises to a height somewhat greater than the maximum level of the liquid to be measured. Fitting over and concentrically around the said tube $c$ is a further tube $d$, this latter being fitted at its upper end with a cap $d'$, and at its lower end being provided with an annular sheet-metal float $e$. From the said cap $d'$ of the tube $d$ rigidly and centrally depends a rod $f$, which, as shown, extends downward through the tube $c$ to a point well below the center of gravity of the combined tube and float, and preferably below the bottom of the float chamber $a$. To help in holding the rod rigidly, at least as far down as the center of gravity of the combined tube and float, a stay $h$ is fitted in the tube.

Opening into the side of the float chamber at a point at or below the minimum level of the liquid to be measured is the pipe $i$ communicating with the tank $j$, see Fig. 2, through which the liquid to be measured flows, the said tank being usually divided into two compartments by a partition in which is a V notch, weir, or orifice.

In proceeding to use the improved arrangement of float chamber and float, the float chamber is placed immediately above the measuring instrument, see Fig. 2, and with the rod $f$ directly above and in line with the rack-carrying rod $k$ of the instrument. The rod $f$ is then connected by an inextensible member $l$, such as a cord, chain or rod, with the top end of the rod $k$, the connection of the said member $l$ with the rod $f$ being preferably by means of the slit end of the rod and a clamp $g$, while the connection of the said member $l$ to the rod $k$ is preferably through the medium of a turnbuckle $m$ to allow of the correct adjustment of the rod $k$ relatively to the float. At the lower end of the rod $k$ may be a weight $o$ to insure of the rod $k$ falling when the float falls.

It should now be seen that with a liquid in the float chamber $a$ and the level of such liquid rising and falling, the vertical movements of the float $e$ will be transmitted in a direct vertical line to the instrument, all pulleys and their attendant drawbacks being avoided. By extending the rigid rod $f$ well below the center of gravity of the combined tube and float there will be no tendency, due to the pull of the connecting member $l$, to tilt the float sidewise or otherwise disturb its equilibrium. Further, as the center line of the float chamber is made to coincide with the center line of the operative member of the instrument, the tendency is to avoid the float touching, or coming into contact either with the float chamber, or with the central tube c, and to eliminate friction.

When the float chamber a is placed, as in Fig. 2, over a feed tank p, a tube p' will be provided in the feed tank for the rod to pass through.

What I claim is:—

1. In combination, an instrument for measuring a liquid flowing over a V notch or weir, or through an orifice, said instrument having an operative member capable of being operated by a float, a float chamber above said instrument, a tank having a V notch, weir or orifice, means whereby the tank communicates with the float chamber, this latter having an orifice in its floor part, an open-ended tube secured to the said floor part of the float chamber and concentric to the said last named orifice, said tube extending upward to a height somewhat above the maximum level of the liquid to be measured, a further tube lying over and around the said fixed tube, a cap in the upper end of the further tube, an annular float at the lower end of the said further tube, this latter being of a length sufficient to allow the float to descend to the minimum level of the liquid to be measured, a rod secured centrally to the said cap in the top end of the further tube and extending to a point well below the center of gravity of the combined tube and float and means for connecting the said rod at its lower end directly to the said operative member of the measuring instrument, substantially as herein set forth.

2. In combination, a float chamber having an orifice in its floor part, an open-ended tube within the chamber and secured to the said floor part concentrically to the said orifice, said tube extending upward to a height somewhat above the maximum level of the liquid to be measured, a further tube lying over and around the fixed tube, a cap in the upper end of the further tube, an annular float at the lower end of the said further tube, this latter being of a length sufficient to allow the float to descend to the minimum level of the liquid to be measured, a rod secured centrally to the said cap in the top end of the further tube and extending to a point well below the center of gravity of the combined tube and float, a stay within the further tube through which the rod passes, a liquid measuring instrument and connecting means at the lower end of the rod for connecting the rod to the operative member of said measuring instrument, substantially as herein set forth.

3. In combination, an instrument for measuring a liquid flowing over a V notch, or weir, or through an orifice, said instrument having an operative member capable of being operated by a float, a float chamber having an orifice in its floor part, an open-ended tube within the chamber and secured to the said floor part concentrically to the said orifice, said tube extending upward to a height somewhat above the maximum level of the liquid to be measured, a further tube lying over and around the fixed tube, a cap in the top end of the further tube, an annular float fixed to the lower end of the further tube, this latter being of a length sufficient to allow the float to descend to the minimum level of the liquid to be measured, a rod secured centrally to the said cap in the top end of the further tube and extending to a point well below the center of gravity of the combined float and tube, a stay within the further tube through which the rod passes, said rod at its lower end having a slit, a clamp on such lower slit end, a turnbuckle connected to the said operative member of the measuring instrument, and means between the said slit end of the rod and the turn-buckle whereby a straight-line connection is obtained, substantially as herein set forth.

In witness whereof I have hereunto set my hand in the presence of two witnesses.

JAMES EDWARD LEA.

Witnesses:
  WALTER GUNN,
  FRED. C. PENNINGTON.

Copies of this patent may be obtained for five cents each, by addressing the "Commissioner of Patents, Washington, D. C."